United States Patent Office 3,576,827
Patented Apr. 27, 1971

3,576,827
PROCESS FOR PREPARING GLYCIDYL ESTERS OF POLYCARBOXYLIC ACID ANHYDRIDES
Clifford F. Dukes, Jeffersontown, and James H. Melloan, Louisville, Ky., assignors to Celanese Coatings Company, New York, N.Y.
No Drawing. Filed May 12, 1969, Ser. No. 823,952
Int. Cl. C07d 1/20; C07c 69/76
U.S. Cl. 260—348.6                22 Claims

ABSTRACT OF THE DISCLOSURE

A process for preparing glycidyl esters of polycarboxylic acid anhydrides by catalytically reacting epichlorohydrin and a polycarboxylic acid anhydride in the presence of water or by reacting water with the polycarboxylic acid anhydride in the presence of epichlorohydrin and then catalyzing the epichlorohydrin, hydrolyzed polycarboxylic acid anhydride reaction wherein the above reactions are carried out at a temperature no higher than about 200° F. to form chlorohydrin esters followed by dehydrohalogenation with alkali metal hydroxide at a temperature of about 70° F. to 150° F.

BACKGROUND OF THE INVENTION

This invention pertains to glycidyl esters of polycarboxylic acid anhydrides, processes for preparing said esters and uses for said esters in coatings and plastics.

The reaction of glycidol with polycarboxylic acid chlorides to prepare glycidyl esters is described in U.S. Pat. 2,865,897. This process is disadvantageous in that the starting materials, glycidol and the acid chlorides, are very reactive and unstable, requiring extreme care in preparation, storage and utilization. In addition the reaction of these compounds to form the glycidyl esters requires very low temperatures and long reaction times.

The epoxidation of allyl esters of polycarboxylic acids to form glycidyl esters is described in U.S. Pat. 2,870,170. Although this process avoids the use of glycidol and acid chlorides, it has disadvantages in that allyl groups are somewhat difficult to epoxidize leading to low yields of the completely epoxidized products with considerable amounts of partially epoxidized esters plus other side reaction products.

Several methods for preparing glycidyl esters by the reaction of epichlorohydrin with polycarboxylic acids have been proposed. U.S. Pat. 2,772,296 discloses the catalytic addition of epichlorohydrin to the acid to form the chlorohydrin ester followed by heating to effect a disproportionation reaction between unreacted epichlorohydrin and the chlorohydrin ester to form glycidyl esters and glycerol dichlorohydrin. This disproportionation reaction is an equilibrium reaction which hinders the effective production of high yields of glycidyl esters. The esters so produced are mixed glycidyl-chlorohydrin esters. Extensive purification is required to separate the glycidyl esters from the by-products and to separate the glycerol dichlorohydrin from the epichlorohydrin.

Glycidyl esters of polycarboxylic acids have been prepared by reacting the dry potassium salt of the acids with epichlorohydrin as described in U.S. Pats. 2,448,602 and 2,940,986. The preparation of the anhydrous salt is very slow and difficult due to foaming and caking. Completely anhydrous conditions are difficult to attain, and when some moisture is present, low yields and impure products result.

Another method for prearinpg glycidyl esters of polycarboxylic acids is described in U.S. Pat. 3,075,999. By this method the polycarboxylic acid is reacted catalytically with epichlorohydrin at the reflux temperature of epichlorohydrin to form the chlorohydrin ester. The chlorohydrin ester is then dehydrohalogenated with alkali at a temperature of 70° C. to 117° C. to form the glycidyl ester. The disadvantages of this process are the formation of undesirable by-products during the initial addition reaction, the saponification of ester groups during the dehydrohalogenation reaction, and the loss of epichlorohydrin through side reactions in the over-all process. Low yields of unreacted epichlorohydrin and glycidyl esters, which are difficult to isolate and purify, result.

In copending application No. 649,827, the preferred method of preparing glycidyl esters starting with polycarboxylic acids is disclosed. In this application glycidyl esters of polycarboxylic acids are prepared by the catalytic addition of epichlorohydrin to a polycarboxylic acid using an excess of epichlorohydrin to form chlorohydrin esters of the polycarboxylic acid followed by dehydrohalogenation of the chlorohydrin esters with alkali metal hydroxides to form the glycidyl esters, the temperatures of the above addition reaction and dehydrohalogenation reaction being controlled within narrowly defined limits.

The disadvantage of this and the other methods described above is that they are not directly applicable to preparing glycidyl esters from polycarboxylic acid anhydrides. In order to prepare esters by these processes the anhydride must first separately be hydrolyzed to its corresponding di-acid and then dried and if necessary recrystallized. These hydrolysis and drying steps add several hours to the processing times and are quite costly.

SUMMARY OF THE INVENTION

By the methods of the invention herein disclosed glycidyl esters of polycarboxylic acid anhydrides are prepared by the in situ hydrolysis of the anhydride ring in the presence of epichlorohydrin. This hydrolysis can be carried out concomitantly with the catalyzed addition reaction between the di-acids formed by this hydrolysis and the epichlorohydrin. Or in an alternate method the polycarboxylic acid anhydride can be hydrolyzed in the presence of epichlorohydrin followed by the addition of catalyst to affect reaction between the hydrolysis product and the epichlorohydrin. Either of the above reactions is then followed by dehydrohalogenation of the resulting chlorohydrin ester with an alkali metal hydroxide. By adding an amount of water equal to that amount required to hydrolyze the anhydride groups present in the polycarboxylic acid anhydride and at least equal to the solubility of water in the amount of epichlorohydrin used, keeping the temperature of the addition reaction at or below 200° F. and controlling the temperature during the dehydrohalogenation reaction between about 70° F. and about 150° F., high yields of glycidyl esters with good purity and high recovery of unreacted epichlorohydrin can be obtained.

Thus by the methods of this invention, glycidyl esters can be prepared from polycarboxylic acid anhydrides by a process which does not require the separate step of hydrolyis and purification of the anhydride starting material. Using these methods significantly shorter processing times are possible without a corresponding decrease in the purity of the glycidyl esters that are produced.

By using enough water to hydrolyze all the anhydride rings in the polycarboxylic acid anhydride plus at least enough water to saturate the epichlorohydrin with water, an essentially pure anhydride derived di-acid is formed. Amounts of water less than this lead to incomplete di-acid formation, high residual chlorine content and high epoxide equivalent weights.

By using a temperature of about 115° F. to about 200° F. during the addition reaction of the epichlorohydrin and the acid, the formation of the 2-hydroxy, 3-chloro, propoxy-1 group (1,2-chlorohydrin group) is enhanced while the formation of the 1-hydroxy, 3-chloro, propoxy-2 group (1,3-chlorohydrin) is minimized. Dehydrohalogenation of the 1,2-chlorohydrin produces the glycidyl or 1,2-epoxy group. The 1,3-chlorohydrin is not dehydrohalogenated under normal conditions and does not produce a glycidyl group. The presence of 1,3-chlorohydrin groups results in low epoxide content and high chlorine in the final product.

By maintaining the temperature between about 70° F. and 150° F. during the dehydrohalogenation step, side reactions are minimized and substantially complete dehydrohalogenation is obtained. Side reactions which are kept to a minimum include saponification of the ester groups, polymerization and hydrolysis of the glycidyl groups and formation of polyepichlorohydrin, glycerol and monochlorohydrins from the excess epichlorohydrin.

DESCRIPTION OF THE INVENTION

The polycarboxylic acid anhydrides which are used in the process of this invention contain from one to two anhydride groups per molecule. In addition these anhydride containing compounds can contain free carboxyl groups, however, no other groups reactive with epoxide molecules can be present. These polycarboxylic acid anhydrides can be aliphatic, cycloaliphatic, aromatic and heterocyclic. The preferred anhydrides are those which are cyclic and contain not more than about 18 carbon atoms per carboxylic acid equivalent. Examples of suitable anhydrides include phthalic anhydride, tetrahydrophthalic anhydride, hexahydrophthalic anhydride, tetrachlorophthalic anhydride, chlorendic anhydride, naphthalene anhydride, trimellitic anhydride, pyromellitic dianhydride, cyclopentene dianhydride, maleic anhydride, succinic anhydride, dodecenyl succinic anhydride and the like.

It is preferred to use epichlorohydrin as the reactant with the polycarboxylic acid. However, epibromohydrin and epiiodohydrin can be used and are considered equivalent for the purposes of this invention.

The amount of epichlorohydrin which is used in this process is in excess of that which will react with each acid group of the hydrolyized polycarboxylic acid anhydride. This excess epichlorohydrin serves as a solvent for the chlorohydrin esters formed in the addition reaction and also as a solvent for the glycidyl esters formed in the dehydrohalogenation reaction. Generally, at least about two mols of epichlorohydrin are used for each carboxylic acid group of the polycarboxylic acid anhydride with the preferred range being about 5 to about 10 mols of epichlorohydrin for each carboxylic acid group.

The amount of water to be used depends upon the amount of epichlorohydrin used and upon the anhydride equivalent weight of the selected polycarboxylic acid anhydride. Anhydride equivalent weight is defined as the molecular weight of the polycarboxylic acid anhydride divided by the number of anhydride groups present in each mol of the particular acid anhydride.

The total amount of water added is a molar quantity equal to the number of equivalents of anhydride plus a weight percentage equal to from about 1.5% to about 4.0% of the total epichlorohydrin concentration. Preferably about 1.5 to 2.5 weight percent of the total epichlorohydrin concentration will be water. Thus at least enough water is added in excess of that required for hydrolysis to saturate the epichlorohydrin with water. When amounts less than this total amount are used low purity high chlorine containing glycidyl esters result.

The catalysts used for effecting the addition of the epichlorohydrin with the carboxylic acid groups formed by hydrolysis are tertiary amines, tertiary amine salts and quaternary ammonium compounds. Examples of these compounds are triethyl amine, tributyl amine, benzyl dimethyl amine, triethyl amine hydrochloride, tripropyl amine hydrobromide, benzyl trimethylammonium hydroxide, tetramethylammonium chloride, tetramethylammonium bromide, tetramethylammonium iodide, trimethylethylammonium acetate and anion exchange resins. The preferred catalyst is tetramethylammonium chloride. The amount of catalyst which is used in this process is 0.5 to about 5% by weight based on the weight of the hydrolyzed polycarboxylic acid anhydride with the preferred range being 1% to 3%.

In carrying out the first step of the process of this invention, the epichlorohydrin, polycarboxylic acid anhydride water and catalyst are added to a suitable reactor and heat is applied while stirring to raise the temperature to about 115° F. to about 200° F. with the preferred range being about 150° F. to about 175° F. Heating and stirring are continued for a time sufficient to hydrolyze the anhydride groups to acid groups and lower the acid value to about 0. Generally this requires about 1 to about 8 hours. In some instances the polycarboxylic acid anhydride is insoluble in the epichlorohydrin. However, as the reaction progresses, the anhydride generally dissolves in the epichlorohydrin forming a homogeneous solution with subsequent reduction of the acid value to zero.

In an alternate process for carrying out the first step of the process of this invention the epichlorohydrin, polycarboxylic acid anhydride and water are added to a suitable reactor and heat is applied while stirring to raise the temperature to about 115° F. to about 200° F., the reaction mixture is held at the desired temperature until all of the polycarboxylic acid anhydride has been hydrolyzed to polycarboxylic acid. At this point catalyst is added and the reaction continued as above.

In conducting the second step of the process of this invention alkali metal hydroxides are used as the dehydrohalogenating agents. The alkali metal hydroxides can be added in powdered, flake or pellet form, but preferably they are added as aqueous solutions. Another suitable means of adding alkali metal hydroxides is as a dispersion at 30 to 70 weight percent concentration in an inert solvent such as xylene. These dispersions can be prepared by grinding a suspension of flake caustic, xylene and a small amount of fatty acid on a pebble or ball mill.

The preferred alkali metal hydroxides are sodium and potassium hydroxide with the most preferred being sodium hydroxide. The amount of alkali metal hydroxide that is used is substantially equivalent to the chlorine content of the chlorohydrin ester formed in the first reaction. Generally the amount of alkali metal hydroxide will be from about 1.0 to 1.3 mols for each chlorine of the chlorohydrin ester.

After the first step of this process is completed as evidenced by the acid value being about zero, the temperature of the solution of chlorohydrin ester of the polycarboxylic acid anhydride in epichlorohydrin is adjusted to about 70° F. to about 150° F. The addition of the alkali metal hydroxide is begun while applying sufficient vacuum to continuously remove the water from the reactants as a water-epichlorohydrin distillate. The water is separated from the distillate and the epichlorohydrin is continuously returned to the reactor. The temperature during the dehydrohalogenation reaction is controlled between 70° F. and 150° F. with the preferred temperatures being 105° F. to 130° F. The reduced pressure under which the reaction is conducted is the pressure sufficient to allow removal of the water at the reaction temperature. Generally this reduced pressure will be about 5 to 100 mm. Hg absolute. The time required to complete the dehydrohalogenation reaction will vary somewhat depending upon the addition rate of the alkali metal hydroxide as well as the exact temperature of the reaction, but will generally be in the range of 1 to 8 hours. After the dehydrohalogenation reaction is completed, the reaction mixture is held at reaction temperatures for an additional 10 minutes to one hour (preferably 20–40 minutes) to insure complete reaction of the alkali metal hydroxide. The glycidyl ester of the polycarboxylic acid can then be recovered by any of several well known methods. The salt can be removed by filtration, centrifugation or by addition of water to dissolve the salt with subsequent removal of the brine layer. The epichlorohydrin is then removed by distillation under vacuum and the glycicdyl ester product is recovered.

However, when high yields of pure glycidyl esters are desired a two step dehydrohalogenation reaction is preferred. After the first dehydrohalogenation step is carried out as above, the solution is held for about 10 minutes to about 1 hour at reaction temperature at a pressure of about 10–100 mm. Hg to remove any remaining water that may be present. The solution is then heated to about 220° F. to about 250° F. under a pressure of about 10–100 mm. Hg. When the remaining epichlorohydrin has in this manner been removed an inert non-reactive solvent in which the glycidyl ester is soluble is added, reducing the solids of the solution in the reaction flask to about 25 to about 50 weight percent. Generally any solvent non-reactive with epoxide groups is suitable. However, in selecting the desired solvent, those of boiling points of no more than 250° F. are preferred. Solvents with boiling points in excess of this range are difficult to remove by vacuum and may lead to scorching of the glycidyl ester product. The solvent must also be relatively water insoluble, otherwise separation of the brine layer will not be possible. The usual solvents for this step are aliphatic ketones preferably methyl isobutyl ketone (MIBK).

To this above solution enough water is added to dissolve the alkali halide formed by the first dehydrohalogenation and the agitation is stopped. After 10 to 30 minutes the brine layer is drawn off and the remaining solution in the reaction flask is headed to about 70° F. to 150° F. (preferably 100° F. to 120° F.) under a pressure of 10–1000 mm. Hg and held until all water present is removed. This step usually takes ½ to 1½ hours. At this point a second dehydrohalogenation is carried out over a 1 to 8 hour period, collecting all water that distills over and returning any solvent to the reactor. When all the metal hydroxide solution has been added, an amount of water sufficient to dissolve all alkali halide salts formed in this second dehydrohalogenation is added. Agitation is again halted for from 10 to 30 minutes at which time the brine layer is removed. The solution remaining in the reaction flask is then heated at about 285° F. to about 375° F. under a pressure of 10 to 100 mm. Hg and held until substantially all of the inert solvent as added after the first dehydrohalogenation and any remaining excess epichlorohydrin have been removed. The liquid or solid remaining in the reaction flask at this point is a highly pure glycidyl ester of the polycarboxylic acid anhydride which was used as a starting material.

Additional dehydrohalogenation steps can be carried out to achieve still purer products. However, usually this is not necessary.

The following examples describe the process of this invention in detail. Parts where used are parts by weight.

EXAMPLE 1

A suitable reactor was equipped with a mechanical stirrer, a thermocouple attached to a temperature recording device, an inlet tube, a vacuum connection and a condenser fitted with a well for collecting distilled water and epichlorohydrin from which the water could be withdrawn and the epichlorohydrin could be returned to the reactor. To this reactor were added 358.2 parts hexahydrophthalic anhydride, 2151 parts epichlorohydrin, 73.9 parts of water and 8 parts tetramethylammonium chloride. Agitation was begun and heat was applied raising the temperature to 175° F. The temperature was held at 175° F. for 2 hours and 30 minutes at which time the acid value of the solution was 0 indicating complete esterification of the hydrolyzed hexahydrophthalic anhydride.

The reactants were cooled at 105° F. and vacuum was applied lowering the pressure within the reactor to about 55 mm. Hg pressure. A 50% aqueous solution of sodium hydroxide (415.5 parts) was added to the reactants over a period of 5 hours and 15 minutes, while maintaining a temperature of 130° F. and sufficient vacuum to continuously distill water and epichlorohydrin. 340 parts of water were separated from the distillate while the epichlorohydrin was returned to the reactor. After all the sodium hydroxide had been added, the temperature was held at 130° F. for an additional 30 minutes, during which time 5 additional parts of water were removed. The vacuum was released and 2076 parts of methyl isobutyl ketone (MIBK) were added to the reactor followed by 1210 parts of water. When all the salt, which had formed from the dehydrohalogenation reaction, was dissolved, agitation was stopped to allow the brine layer to separate from the organic layer. The brine layer was then drawn off and discarded.

The temperature of the reactants was adjusted to 110° F., the pressure was reduced to 35–40 mm. Hg and an additional 83.0 parts of 50% aqueous sodium hydroxide were added over a period of 3 hours. After all the sodium hydroxide had been added, the temperature was held at 110° F. for 10 minutes. The total amount of distilled water separated during this step of the reaction was 70 parts. The salt formed in the reaction was dissolved in 500 parts of water and was withdrawn as described above. The remaining epichlorohydrin and MIBK were removed from the product by distillation to a pot temperature of 300° F. under 40 mm. Hg pressure. 580 parts of diglycidyl hexahydro ortho phthalate were recovered having an epoxide equivalent weight of 154 (theoretical-142), a total chlorine content of 0.81% and a Gardner-Holdt viscosity of 25° C. of J–K.

EXAMPLE 2

To a reactor equipped as described in Example 1, were added 357.7 parts of tetrahydrophthalic anhydride, 2176.5 parts of epichlorohydrin and 8 parts of tetramethylammonium chloride and 74.9 parts of water. The reactants were heated at 150° F. until the acid value was reduced to 0, a period of 2 hours and 30 minutes. The temperature was lowered to 130° F., vacuum (60–70 mm. Hg pressure) was applied, and 376 parts of 50% aqueous sodium hydroxide were added over a period of 4 hours using the procedure as described in Example 1. The salt of reaction was removed by dissolution in 1015 parts and 694 parts respectively of water and of MIBK. Following the remaining procedure of Example 1, 525.5 parts of diglycidyl tetrahydro orthophthalate were recovered having an epoxide equivalent weight of 161 (theoretical-149) a total chlorine content of 1.63%, and a Gardner-Holdt viscosity at 25° C. of T–U.

EXAMPLE 3

Using the same procedure as described in Example 1, 357 parts of phthalic anhydride were reacted with 2228 parts of epichlorohydrin and 8 parts of tetramethylammonium chloride and 76.4 parts of water at a temperature of 170° F. to 180° F. for 6 hours and 30 minutes until the acid value was reduced to zero. Dehydrohalogenation was carried out by the addition of 385 parts of 50% aqueous sodium hydroxide over a period of 4 hours at a temperature of 130° F. and a pressure of 65–75 mm. Hg. After the addition of 1210 and 2076 parts respectively of water and MIBK and subsequent removal of the brine, an additional 77 parts of 50% aqueous sodium hydroxide were added over 3 hours at 110° F. and 30–35 mm. Hg pressure. After removing the salt by dissolution in 500 parts of water, the glycidyl ester was recovered as described in Example 1. The diglycidyl ortho phthalate product (510 parts) had an epoxide equivalent weight of 157 (theoretical-139), a chloride content of 1.68, and a Gardner-Holdt viscosity at 25° C. of V–W.

EXAMPLE 4

Using the same procedure as described in Example 3, 357 parts of phthalic anhydride were reacted with 2228 parts of epichlorohydrin and 8 parts of tetramethylammonium chloride and 43 parts of water at 170–180° F. for 2 hours and 10 minutes. After the addition reaction was completed, dehydrohalogenation was conducted by adding 385 parts of 50% aqueous sodium hydroxide at a temperature of 130° F. and 65–75 mm. Hg pressure, over a period of 4 hours. After the addition of 1170 and 2010 parts respectively of water and MIBK and subsequent removal of brine solution, a second dehydrohalogenation was conducted wherein 77 parts of 50% aqueous sodium hydroxide were added over 2 hours at a temperature of 110° F. and a pressure of 30–35 mm. Hg. Salt formed by this reaction was removed by dissolution in 500 parts of water and the glycidyl ester was recovered as in Example 1. The diglycidyl ortho phthalate product (466 parts) recovered in this manner had an epoxide equivalent weight of 182 (theoretical-139), a chlorine content of 3.08% and a Gardner-Holdt viscosity of $Z_1$–$Z_2$ at 25° C.

Thus a product prepared in the manner of Example 4, wherein only enough water was added to theoretically hydrolyze all available anhydride groups, was found to be inferior to a product prepared as in Example 3 which contained an additional amount of water to saturate the epichlorohydrin used in the addition reaction. See Table I.

TABLE I

| Example: | Amount of water in addition to theoretical for hydrolyzation | Weight per epoxide (139 theoretical) | Total chlorine | Gardner Holdt viscosity at 25° C. |
|---|---|---|---|---|
| 3 | 1.5 weight percent of epichlorohydrin. | 157 | 1.68 | V–W |
| 4 | 0 | 182 | 3.08 | $Z_1$–$Z_2$ |

The products of Examples 1, 2 and 3 were each evaluated for tensile strength, tensile elongation and volume resistivity by preparing cured samples as in Table II, shown below:

TABLE II

| Example | 1 | 2 | 3 |
|---|---|---|---|
| Parts of glycidylester | 100 | 100 | 100 |
| Parts of hexahydrophthalic anhydride | 95 | 76.4 | 93 |
| Parts of diethylamino ethanol | .05 | .05 | .05 |
| Cure schedule | (1) | (2) | (1) |
| Tensile strength (p.s.i.) | 12,700 | 13,110 | 14,290 |
| Tensile elongation (percent) | 4.7 | 5.1 | 5.6 |
| Volume resistivity (ohm-cm.) at — | | | |
| 77° F | >$10^{16}$ | 1×$10^{15}$ | >$10^{16}$ |
| 151° F | 9×$10^{15}$ | 5×$10^{14}$ | 6×$10^{15}$ |
| 199° F | 2×$10^{14}$ | 1×$10^{14}$ | 3×$10^{14}$ |
| 266° F | 5×$10^{11}$ | 3×$10^{11}$ | 7×$10^{11}$ |
| 302° F | 5×$10^{10}$ | 4×$10^{10}$ | 5×$10^{10}$ |
| 356° F | 8×$10^{9}$ | 5×$10^{9}$ | 3×$10^{9}$ |
| 399° F | <$10^{9}$ | <$10^{9}$ | <$10^{9}$ |

[1] 16 hours at 250° F.   [2] 16 hours at 257° F.

The glycidyl esters of polycarboxylic acid anhydrides prepared by the process of this invention can be utilized in a variety of applications. They can be cured with aliphatic amines, aromatic amines, polycarboxylic acids, polycarboxylic acid anhydrides, Lewis acids, polymercaptans, carboxylic acid containing vinyl and acrylic copolymers, polyphenols and the like.

Curing agents for epoxide resins can be prepared from these glycidyl esters by reacting them with polyamines, polymercaptans and polycarboxylic acid using the co-reactant in excess over the epoxide groups of the glycidyl ester so that the curing agents contain the functional amine, mercaptan or acid groups rather than the epoxide group.

These glycidyl esters can be polymerized to intermediate and high molecular weight polymers by reaction with dicarboxylic acids, dihydric phenols or dihydric alcohols. The intermediate molecule weight polymers can be modified by esterification with fatty acids to form air-drying and heat-curing coating compositions. The intermediate and high molecular weight polymers can also be cured by reaction with polyisocyanates, aminoplast resins, phenol-aldehyde resins and acid containing acrylic copolymers. The high molecular weight polymers can also be used without further modification as thermoplastic molding compositions.

Glycidyl esters derived from low molecular weight acid anhydrides, in a few cases, have a tendency to crystallize upon standing. In some instances this tendency to crystallize is advantageous in that high purity products can be isolated readily and the crystals can be used to prepare solid stable molding powders, fluidized bed powders and the like. However, for many uses low viscosity fluid glycidyl esters are preferred since the fluid resins can be easily removed from their storage containers, and readily metered or weighed for use. Low viscosity resins can be easily blended with a variety of curing agents and will tolerate a high level of fillers for further modifications. In order to keep the glycidyl esters in the fluid low viscoscity state, they can be reacted with small amounts of epoxide reactive compositions, such as mono and polyamines, mono and polyphenols, mono and polybasic acids, mono and poly mercaptans, mono and poly organic isocyanates and the like. The amount of modifiers that can be used should be sufficient to inhibit crystallization, but should not be enough to cross-link the glycidyl esters or polymerize them to any great extent. The amount of modifiers can be varied quite widely depending upon the functionality of the glycidyl ester and the weight per functional group of the modifier. Generally, however, the amount of modifiers will be about 1% to about 10% by weight based on the weight of the glycidyl ester.

Glycidyl esters of polycarboxylic acid anhydride can be purified by extraction, crystallization, or distillation for use in specialty applications where higher purity is required.

Glycidyl esters and their derivatives can be used as modifiers for conventional epoxide resins derived from polyhydric phenols, polyhydric alcohols and cycloaliphatic compounds. The glycidyl esters can be used as reactive diluents for the conventional epoxide resins by simply blending the ester with resin. The esters can also be used as plasticizers for the conventional epoxide resins as well as means for improving the adhesive, film and resistance properties in many applications.

Glycidyl esters can be used as vinyl stabilizers, in molding, encapsulating and laminating applications, and in conventional solution type paints as well as in 100% solids coatings. Particularly important uses for these glycidyl esters and derivatives are in the formulation and preparation of non-chalking, weather resistant coatings and molded articles.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for producing glycidyl esters of polycarboxylic acid anhydrides which comprises
  (a) dissolving the polycarboxylic acid anhydride in epichlorohydrin wherein at least 2 mols of epichlorohydrin are present for each carboxylic acid equivalent of the polycarboxylic acid anhydride,
  (b) conducting the hydrolysis of the polycarboxylic acid anhydride in the presence of an amount of water equivalent to the anhydride equivalents in the polycarboxylic acid anhydride plus an amount of water at least equivalent to the solubility of water in epichlorohydrin, wherein said hydrolysis is conducted concomitantly with the reaction of the epichlorohydrin and the polycarboxylic acid anhydride hydrolysis product at a temperature of about 115° F. to 200° F. for a time sufficient to reduce the acid value of the hydrolyzed polycarboxylic acid anhydride to zero using as a catalyst a tertiary amine, tertiary amine salt or a quaternary ammonium compound, and (c) dehydrohalogenating the chlorohydrin ester by slow addition of an alkali metal hydroxide at a temperature of about 70° F. to about 150° F. under reduced pressure sufficient to distill and remove the water formed in the reaction at the reaction temperature.

2. The process of claim 1 wherein step (c) is followed by at least one additional reaction which comprises dehydrohalogenation by slow addition of an alkali metal hydroxide at a temperature of about 70° F. to 150° F. under reduced pressure sufficient to distill and remove the water formed in the reaction at the reaction temperature.

3. The process of claim 1 wherein the epichlorohydrin and the polycarboxylic acid anhydride are reacted in the presence of water at a temperature of 150° F. to 175° F. and the dehydrohalogenation reaction is conducted at a temperature of 105° F. to 130° F.

4. The process of claim 1 wherein the dehydrohalogenation reaction is conducted at a pressure of 5 to 100 mm. Hg absolute.

5. The process of claim 1 where 4 to 10 mols of epichlorohydrin are present for each carboxylic acid equivalent of the polycarboxylic acid anhydride and wherein 1 to 1.3 mols of alkali metal hydroxide are used for each chlorine of the chlorohydrin ester.

6. The process of claim 1 wherein the water is present in an amount equivalent to the anhydride equivalents present in the polycarboxylic acid anhydride plus an amount equivalent to from 1.5 to 4.0 weight percent of the total weight of the epichlorohydrin present.

7. The process of claim 1 wherein the polycarboxylic acid anhydride is phthalic anhydride.

8. The process of claim 1 wherein the polycarboxylic acid anhydride is tetrahydrophthalic anhydride.

9. The process of claim 1 wherein the polycarboxylic acid anhydride is hexahydrophthalic anhydride.

10. The process of claim 1 wherein the catalyst is tertamethyl ammonium chloride and the alkali metal hydroxide is sodium hydroxide.

11. The process of claim 1 wherein the sodium hydroxide is in the form of a solution or dispersion at 30 to 70 weight percent concentration.

12. A process for producing glycidyl esters of polycarboxylic acid anhydrides which comprises
(a) dissolving the polycarboxylic acid anhydride in epichlorohydrin wherein at least 2 mols of epichlorohydrin are present for each carboxylic acid equivalent of the polycarboxylic acid anhydride,
(b) hydrolyzing the polycarboxylic acid anhydride with an amount of water equivalent to the anhydride equivalents in the polycarboxylic acid anhydride plus an amount at least equivalent to the solubility of water in epichlorohydrin,
(c) conducting the reaction of the epichlorohydrin and the hydrolyzed polycarboxylic acid anhydride at a temperature of about 115° F. to about 200° F. for a time sufficient to reduce the acid value of the hydrolyzed polycarboxylic acid anhydride to zero using as a catalyst a tertiary amine, tertiary amine salt, or quaternary ammonium compound, and
(d) dehydrohalogenating the formed chlorohydrin ester by slow addition of an alkali metal hydroxide at a temperature of about 70° F. to above 150° F. under reduced pressure sufficient to distill and remove the water formed in the reaction at the reaction temperature.

13. The process of claim 12 wherein step (d) is followed by at least one additional reaction which comprises dehydrohalogenation by slow addition of an alkali metal hydroxide at a temperature of about 70° F. to 150° F. under reduced pressure sufficient to distill and remove the water formed in the reaction at the reaction temperature.

14. The process of claim 12 wherein the epichlorohydrin and the polycarboxylic acid anhydride are reacted in the presence of water at a temperature of 150° F. to 175° F. and the dehydrohalogenation reaction is conducted at a temperature of 105° F. to 130° F.

15. The process of claim 12 wherein the dehydrohalogenation reaction is conducted at a pressure of 5 to 100 mm. Hg absolute.

16. The process of claim 12 where 4 to 10 mols of epichlorohydrin are present for each carboxylic acid equivalent of the polycarboxylic acid anhydride and wherein 1 to 1.3 mols of alkali metal hydroxide are used for each chlorine of the chlorohydrin ester.

17. The process of claim 12 where the water is present in an amount equivalent to the anhydride equivalents present in the polycarboxylic acid anhydride plus an amount equivalent to from 1.5 to 4.0 weight percent of the total weight of the epichlorohydrin present.

18. The process of claim 12 wherein the polycarboxylic acid anhydride is phthalic anhydride.

19. The process of claim 12 wherein the polycarboxylic acid anhydride is tetrahydrophthalic anhydride.

20. The process of claim 12 wherein the polycarboxylic acid anhydride is hexahydrophthalic anhydride.

21. The process of claim 12 wherein the catalyst is tetramethyl ammonium chloride and the alkali metal hydroxide is sodium hydroxide.

22. The process of claim 12 wherein the sodium hydroxide is in the form of a solution or dispersion at 30 to 70 weight percent concentration.

References Cited

UNITED STATES PATENTS

| | | | |
|---|---|---|---|
| 2,772,296 | 11/1956 | Mueller | 260—348 |
| 2,779,783 | 1/1957 | Hayes | 260—485 |
| 3,372,142 | 3/1968 | Smith | 260—47 |
| 3,483,169 | 12/1969 | Case et al. | 260—78.4 |

JOSEPH L. SCHOFER, Primary Examiner

J. KIGHT, Assistant Examiner

U.S. Cl. X.R.

260—485, 78.4